3,849,502
HYDROXYLATION OF AROMATIC COMPOUNDS
Francois Bourdin and Michel Costantini, Lyon, Michel Jouffret, Francheville-le-Bas, and Guy Lartigau, Lyon, France, assignors to Rhone-Poulenc S.A., Paris, France
No Drawing. Filed Dec. 23, 1970, Ser. No. 101,149
Claims priority, application France, Dec. 30, 1969, 6945467
Int. Cl. C07c 37/00
U.S. Cl. 260—613 D                7 Claims

ABSTRACT OF THE DISCLOSURE

Phenols and phenyl ethers are hydroxylated with hydrogen peroxide in the presence of catalytic amounts of a strong acid, the content of water in the reaction medium being initially less than 20% by weight of the phenol or phenol ether/water/hydrogen peroxide mixture. A complexing agent e.g. $H_3PO_4$ is preferably used to complex any transition metal ions present in the reaction medium. High yields of hydroxylated products can be obtained in reaction times of up to about 1 hour.

---

The present invention relates to the hydroxylation of aromatic compounds, and, more particularly, to a process for hydroxylating phenols and phenol ethers using hydrogen peroxide.

Numerous processes have been described for oxidising phenols and phenol ethers with hydrogen peroxide in combination with metal salts, or with organic peracids (formed from hydrogen peroxide and a carboxylic acid). According to the circumstances, these processes have allowed a hydroxyl radical to be introduced into the nucleus of the aromatic compound, or have brought about a more or less extensive oxidation of this nucleus, ranging from the production of quinones to the opening of the benzene ring with the formation of degradation products.

Thus, A. Chwala et al., J. Prakt. Chem. 152, 46 (1939) oxidised phenol with hydrogen peroxide in the presence of ferrous sulphate, in water acidified with sulphuric acid, to give a mixture of hydroquinone and pyrocatechol with a yield of 72% relative to the hydrogen peroxide used in the reaction. In spite of the good yields which it produces, this process has no industrial value on account of, firstly, the particularly prolonged contact times which it requires, which are the result of having to operate at the temperature of ice-cold water, and, secondly, the very great dilution of the reaction medium necessitated by this type of reaction. Moreover, it has been pointed out by Stein, J. Chem. Soc. 1951 3266 that reaction must be conducted under relatively mild conditions to avoid a violent reaction leading to benzoquinone.

G. G. Henderson et al., J. Chem. Soc. 91 1659.69 (1910), proposed oxidising phenols with hydrogen peroxide in acetic acid which acted as solvent and provided peracetic acid. In the case of phenol, a reaction of several days at ambient temperature was necessary to obtain a mixture of hydroquinone, pyrocatechol and p-benzoquinone. Under analogous conditions, cresols lead to tarry products containing dihydroxymethylbenzenes.

The oxidation of various phenol ethers with organic peracids has also been carried out. Depending on the circumstances, these ethers were converted into quinones or even further oxidised with the opening of the aromatic ring, or, in some cases, were not even sensitive to the oxidising agent, see S. L. Friess et al. J. Am. Chem. Soc. 74 1305 (1952); H. Fernholz, Chem. Ber. 87 578 (1954); H. Davidge et al., J. Chem. Soc. 1958 4569. Anisole and its homologues were not converted, or led to unidentified water-soluble products.

J. D. McClure et al. (J. Org. Chem. 27 627-8 (1962)) oxidised anisole and disphenyl ether in methylene chloride with trifluoroperacetic acid. The reaction did in fact allow phenolic hydroxy groups to be introduced into the aromatic nucleus, but the yields obtained were moderate; in the case of anisole, a mixture of isomeric methoxyphenols was obtained, with a yield of 34% relative to the phenol ether. However, the preparation of trifluoroperacetic acid is dangerous and can give rise to explosions.

Thus, industry has no simple method available for introducing hydroxyl radicals into an aromatic nucleus with hydrogen peroxide. In particular, existing processes for hydroxylating phenols, particularly phenol itself, in aqueous media, require dilution conditions which remove all industrial character from these processes, and, when these conditions are not adhered to, do not allow the desired products to be obtained. Furthermore, the use of an excess of acid, when hydroxylation is achieved with a peracid, complicates the recovery of the products formed.

The present invention provides a process for hydroxylating an aromatic compound of the general formula:

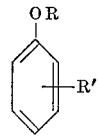

in which R and R' are identical or different radicals and each represent a hydrogen atom or an alkyl radical containing from 1 to 4 carbon atoms, which comprises treating aromatic compound with hydrogen peroxide in the presence of a catalytic amount of a strong acid, the initial content of water in the reaction medium being below 20% by weight of the aromatic compound/$H_2O_2$/$H_2O$ mixture.

In the general formula of the aromatic compounds defined above, R and R' may represent, a methyl, ethyl, radical or one of the various isomeric propyl or butyl radicals. Phenols, the cresols, anisole and phenetole are suitable starting materials.

It has been found that the rate of reaction varies inversely to the initial amount, by weight, of water in the reaction medium. This water can be introduced into the reaction medium by the reactants used. Even though the reaction still occurs at a rate which is of value industrially at an initial content of water of 20%, by weight, of the aromatic compound/$H_2O_2$/$H_2O$ mixture, it is preferable to operate with contents of water below 10% of the aromatic compound/$H_2O_2$/$H_2O$ mixture, in order to obtain high reaction outputs.

The amount of hydrogen peroxide used may generally be of the order of one molecule of $H_2O_2$ per molecule of aromatic compound; it is, however, preferable not to exceed 0.3 mol, and more particularly 0.15 mol, of $H_2O_2$ per mol of aromatic compound.

The concentration of the aqueous solution of hydrogen peroxide used is, in general, not critical. It is appropriate, however, to select aqueous solutions of which the concentration allows less than 20%, and preferably less than 10%, by weight, of water to be introduced into the reaction medium. In general, aqueous solutions of hydrogen peroxide having a concentration above 20% by weight are very suitable.

It has been found that the strong acids exert a true catalytic activity in the reaction of the hydrogen peroxide with the aromatic compounds. By the term "strong acid" is meant, in the present invention, an acid having a pK $H_2O$ value below −0.1, and preferably below −1. The pK $H_2O$ is defined as the ionic dissociation constant of an acid/base pair when water is taken as solvent. It represents the cologarithm of the dissociation constant of an acid/base pair in water, see A. Collumeau, Bull. Soc.

Chim. Fr. 5088 (1968). It is preferable to use a strong acid which is stable to oxidation by hydrogen peroxide, such as sulphuric acid, chlorosulphonic acid, perchloric acid, nitric acid, sulphonic acids such as methanesulphenic acid, ethanesulphonic acid, ethanedisulphonic acid, methoxysulphonic acid, benzenesulphonic acid, benzenedisulphonic acids, toluenesulphonic acids, naphthalenesulphonic acids and disulphonic acids, and sulphonated polymers, such as those derived from styrene, e.g. a sulphonated styrene/divinylbenzene copolymer.

The amount of acid, expressed in proton equivalents, relative to the number of molecules of hydrogen peroxide taking part in the reaction, can vary within wide limits as a function of the order conditions of the reaction, and especially of the temperature. Even though the hydroxylation can be conducted with $H^+/H_2O_2$ ratios as low as $1 \times 10^{-4}$, it is preferable, in order to obtain a sufficient reaction rate, to work with $H^+/H_2O_2$ ratios of at least $1 \times 10^{-3}$: In general there is no value in attaining $H^+/H_2O_2$ ratios greater than 1, and it is sufficient to limit them to a value below 0.5.

It has been found, contrary to the processes of the prior art carried out in dilute aqueous medium and using Fenton's reagent, that the presence of metal ions is prejudicial to the process of the invention taking place satisfactorily, particularly in the case of phenols, where the yields of hydroxylation products are low. Consequently, it is preferable to inhibit the action of metal ions.

The chemically active metal ions which are detrimental to the hydroxylation taking place satisfactorily, are the ions of transition metals, particularly iron, copper, chromium, cobalt, manganese and vanadium ions. The metal ions are derived from the reactants, especially the aromatic compounds, and by the apparatus used. In order to inhibit the action of these metal ions, the reaction may be carried out in the presence of one or more complexing agents which are stable to hydrogen peroxide, which give complexes which cannot be decomposed by the strong acids present, and in which the metal can no longer exert any chemical activity. Moreover, it is immaterial whether the complexing agents (or ligants) lead to complexes which are soluble or which are insoluble in the reaction medium. The complexing agent or agents introduced into the reaction medium are selected as a function of the metals present and of their ability to form stable complexes under the reaction conditions. The complexing agents which are suitable for a particular case can be determined by means of simple tests. Complexing agents such as phosphoric acids (ortho, meta or pyrophosphoric acids or their mixtures) and their alkyl, cycloalkyl or alkaryl acid esters containing up to about 10 carbon atoms in the alkyl portion e.g. ethyl, diethyl, methyl, hexyl, cyclohexyl, benzyl, octyl or ethylhexyl phosphates, and polyphosphoric acids, may be used.

The amount of complexing agent present in the reaction medium depends on the content of metal ion in this medium. There is no upper limit to the amount of complexing agent that can be used and the amount can be greatly in excess over the amount necessary to complex the metal ions present. In practice, an amount which is from 0.0001 to 5% by weight of the reaction medium is very suitable.

The process may be conducted at temperatures between 20 and 150° C., and preferably between 30 and 120° C., the use of pressure only being necessary if the process is carried out above the boiling point of the aromatic compound.

The reaction can be carried out in the presence of inert organic solvents, such as, for example, 1,2-dimethoxyethan, chloroform or dichloroethan, particularly when the temperature chosen is below the melting point of the aromatic compound.

The reactants and working conditions are very suitable for carrying out the process described in a continuous manner.

The following Examples are given to illustrate the invention.

EXAMPLE 1

47 g. of phenol (0.5 mol), 0.6 g. of 98% $H_2SO_4$ (0.006 mol) and 0.45 g. of 90% $H_3PO_4$ (0.004 mol), are introduced into a 250 cm.$^3$ volume, 3-necked flask provided with a stirring system, a reflux condenser, a thermometer and a heating device. The contents of the flask are heated to 45° C., and 0.9307 g. of 95.6% hydrogen peroxide (representing 0.0262 mol of $H_2O_2$) is added all at once.

A rapid rise in the temperature to 73° C. is noted. After 30 minutes at 45° C., it is found that the hydrogen peroxide has completely disappeared. The reaction medium is neutralised with a normal solution of sodium hydroxide in methanol, and the diphenols formed are then identified chromatographically.

1.34 g. of pyrocatechol (yield relative to $H_2O_2$: 46.7%) and 0.68 g. of hydroquinone (yield relative to $H_2O_2$: 23.6%), are obtained, the total yield of diphenols being 70.3%, relative to $H_2O_2$.

EXAMPLE 2

The process of Example 1 is repeated replacing $H_2SO_4$ by $HClO_4$, and using 47 g. of phenol (0.5 mol), 0.6 g. of 60% $HClO_4$ (0.004 mol), 0.45 g. of 90% $H_3PO_4$ and 0.92 g. of 96.6% $H_2O_2$ (0.0259 mol). The reaction is complete after 30 minutes at 45° C. ($H_2O_2$ has completely disappeared). 1.26 g. of pyrocatechol and 0.90 g. of hydroquinone are identified in the medium, representing a total yield of 76% of diphenols, relative to $H_2O_2$.

EXAMPLE 3

The process of Example 1 is repeated replacing $H_2SO_4$ by p-toluenesulphonic acid and using the following conditions:

$H_2O_2$/phenol ratio=0.05
$H^+/H_2O_2$ ratio=0.2
0.5 mol of phenol
Temperature 45° C.
Duration of reaction: 30 minutes.

The reaction mass is not neutralised. The determination is carried out as in Example 1, and 1.3 g. of pyrocatechol and 0.44 g. of hydroquinone are identified, representing a total yield of 61%, relative to $H_2O_2$ used initially.

EXAMPLE 4

The process of Example 1 is repeated replacing 96.6% hydrogen peroxide by 44% hydrogen peroxide and using 0.5 mol of phenol, 0.025 mol of $H_2O_2$ (1.93 g. of 44% $H_2O_2$), 0.005 mol of $H_2SO_4$ and 0.004 mol of $H_3PO_4$. It is necessary to maintain the reaction at 45° C. for 3 hours, in order to bring it to completion. 1.28 g. of pyrocatechol and 0.48 g. of hydroquinone, corresponding to a total yield of 63%, relative to $H_2O_2$ used, are identified in the reaction mass.

EXAMPLE 5

The process of Example 1, is repeated under the conditions, and with the results, recorded in the following Table:

| Temperature, ° C. | $H_2O_2$/phenol | $H^+/H_2O_2$ | Yields relative to $H_2O_2$ used, percent | | |
|---|---|---|---|---|---|
| | | | Pyrocatechol | Hydroquinone | Total |
| 45 | 0.1 | 0.1 | 40 | 17 | 57 |
| 80 | 0.1 | 0.1 | 41 | 17 | 58 |

EXAMPLE 6

The process of Example 2, is repeated but using 0.038 g., instead of 0.6 g., of 60% $HClO_4$. The $H^+/H_2O_2$ ratio changes from 0.144 in Example 2 to $8 \times 10^{-3}$.

After a reaction time of 1 hour 30 minutes at 45° C., there still remains 70% of the hydrogen peroxide introduced. It requires 10 hours in order to carry the reaction to completion. The yields of hydroquinone and pyrocatechol, relative to the hydrogen peroxide used, are, respectively, 20% and 33.5%.

EXAMPLE 7

The process of Example 2 is repeated but varying the $H_2O_2$/phenol ratio as shown in the following Table to obtain the results shown in the Table:

| $H_2O_2$/phenol | Yields relative to $H_2O$ used, percent | | |
|---|---|---|---|
| | Hydroquinone | Pyrocatechol | Total |
| 0.1 | 23 | 37 | 60 |
| 0.2 | 16.8 | 29.8 | 46.6 |

EXAMPLE 8

0.5 mol of anisole, 0.005 mol of 98% $H_2SO_4$ (0.53 g.), 1 g. of octyl phosphate and 27 g. of 1,2-dimethoxyethane are introduced into the apparatus described in Example 1. The contents of the flask are heated to 100° C., and 0.0265 mol of $H_2O_2$ in the form of 96% aqueous solution is then added. After 1 hours at this temperature the hydrogen peroxide has completely disappeared.

1.32 g. of guaiacol and 0.52 g. of p-methoxyphenol, representing a total yield of methoxyphenols of 56%, relative to $H_2O_2$ used, are determined chromatographically in the reaction mass.

EXAMPLE 9

The process of Example 2 is repeated, replacing phenol by p-cresol. The reaction is complete after heating for 30 minutes at 45° C., and the yield of 1,2-dihydroxy-4-methylbenzene, relative to the hydrogen peroxide, is 47%.

We claim:
1. Process for hydroxylating an aromatic compound of the general formula:

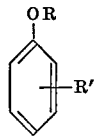

in which R and R', which are identical or different, each represent a hydrogen atom or an alkyl radical having 1 to 4 carbon atoms, wherein the aromatic compound is treated
   at 20–150° C. with hydrogen peroxide in an amount such that the molecular ratio of hydrogen peroxide to the aromatic compound is below 0.3:1,
   in the substantial absence of metal ions and in the presence of a catalytic amount of a strong acid having a pK $H_2O$ value below −0.1 and which is stable to oxidation by hydrogen peroxide, the amounts of hydrogen peroxide and strong acid being such that the ratio of the amount of acid, expressed in proton equivalents, to the number of molecules of hydrogen peroxide taking part in the reaction is $1 \times 10^{-4}$:1 to 1:1, the content of water in the reaction medium being initially below 20% by weight of the aromatic compound/water/hydrogen peroxide mixture, and
   wherein the hydroxylation is carried out in the presence of a complexing agent selected from the groups consisting of a phosphoric acid, an alkyl acid phosphate, a cycloalkyl acid phosphate and a benzyl acid phosphate.

2. Process according to claim 1, wherein the strong acid is sulphuric acid, perchloric acid, p-toluenesulphonic acid or a sulphonated resin.

3. Process according to claim 1 wherein, the $H^+/H_2O_2$ ratio is equal to or greater than $1 \times 10^{-3}$ but is less than 0.5.

4. Process according to claim 1, wherein the aromatic compound is phenol, p-cresol, anisole or phenetole.

5. Process according to claim 1, wherein the hydroxylation is carried out in the presence of an inert organic solvent.

6. Process according to claim 1, wherein phenol or p-cresol is hydroxylated at 30–120° C. in the presence of a sulphuric acid, perchloric acid, or p-toluenesulphonic acid catalyst and phosphoric acid as complexing agent.

7. Process according to claim 1, wherein anisole is hydroxylated in 1,2-dimethoxyethane at 30–120° C. in the presence of a sulphuric acid catalyst and octyl phosphate as complexing agent.

References Cited

UNITED STATES PATENTS

| 3,481,989 | 12/1969 | Vesely et al. | 260—613 D |
| 3,600,446 | 8/1971 | Massie | 260—613 D |
| 3,407,237 | 10/1968 | Vesely | 260—621 G |
| 3,461,170 | 8/1969 | Schmerling | 260—621 G |
| 3,376,351 | 4/1968 | Amedjian et al. | 260—613 D |
| 2,644,014 | 6/1953 | Saunders | 260—621 G |

FOREIGN PATENTS

| 1,501,092 | 10/197 | France | 260—621 |

OTHER REFERENCES

Collumeau, Bull. Soc. Chim., France (1968), 5087–5098.

BERNARD HELFIN, Primary Examiner

U.S. Cl. X.R.

260—621 G, 625